United States Patent [19]

Toye

[11] Patent Number: 4,974,723
[45] Date of Patent: Dec. 4, 1990

[54] LIVE ROLLER CONVEYOR

[75] Inventor: Edward W. Toye, Rock, nr. Kidderminster, United Kingdom

[73] Assignee: Conveyor Units Limited, Stourport-on-Severn, United Kingdom

[21] Appl. No.: 332,780

[22] Filed: Apr. 3, 1989

[51] Int. Cl.$^5$ .............................................. B65G 13/06
[52] U.S. Cl. ...................................... 198/781; 198/790
[58] Field of Search ................................. 198/281, 790

[56] References Cited

U.S. PATENT DOCUMENTS

| | | | |
|---|---|---|---|
| 3,696,912 | 10/1972 | Fleischauer et al. | 198/781 |
| 3,729,088 | 4/1973 | Vom Stein et al. | 198/781 |
| 3,840,110 | 10/1974 | Molt et al. | 198/781 |
| 4,372,442 | 2/1983 | Fleischauer | 198/790 |
| 4,572,353 | 2/1986 | Felder | 198/577 |
| 4,588,073 | 5/1986 | Abell | 198/781 |
| 4,819,788 | 4/1989 | Van Der Schie | 198/781 |

FOREIGN PATENT DOCUMENTS

| | | |
|---|---|---|
| 1304917 | 1/1973 | United Kingdom . |
| 1386903 | 3/1975 | United Kingdom . |
| 2079233 | 1/1982 | United Kingdom . |
| 0264254 | 4/1988 | United Kingdom . |

Primary Examiner—Joseph E. Valenza
Attorney, Agent, or Firm—Webb, Burden, Ziesenheim & Webb

[57] ABSTRACT

A live roller conveyor comprising a plurality of rollers which provide a conveying surface for a plurality of articles supported on said surface, a first friction drive means operable to apply to at least some of the rollers a first torque, a second friction drive means operable to apply to at least some of the rollers a second torque of the opposite rotational sense to that of the first torque and a control means to control the drive means so that a variable driving force may be applied to the articles by the rollers to advance the articles along the conveyor in a first state of operation of the conveyor and to apply a reduced driving force to the articles in a second state of operation of the conveyor.

11 Claims, 5 Drawing Sheets

LIVE ROLLER CONVEYOR

BACKGROUND OF THE INVENTION

This invention relates to a live roller conveyor, that is, a conveyor comprising a plurality of rollers which provide a conveying surface and define a pass line for a plurality of articles supported on said surface and at least some of the roller being driven by a drive means to apply a driving load to the articles to advance the articles along the pass line of the conveyor.

When at least one article is accumulated on a live roller conveyor an undesirably high driving load may be applied to the at least one article.

It is accordingly an object of the present invention to provide a live roller conveyor wherein the imposition of such a high driving load can be avoided.

SUMMARY OF THE INVENTION

According to the present invention we provide a live roller conveyor comprising a plurality of rollers which provide a conveying surface for a plurality of articles supported on said surface, a first friction drive means operable to apply to at least some of the rollers a first torque, a second friction drive means operable to apply to at least some of the rollers a second torque of the opposite rotational sense to that of the first torque and a control means to control the drive means so that a variable driving force may be applied to the articles by the rollers to advance the articles along the conveyor in a first state of operation of the conveyor and to apply a reduced driving force to the articles in a second state of operation of the conveyor.

The control means may be operable, during the second state of operation of the conveyor when a reduced driving force is applied to the articles, so that the first drive means is operable to apply to the rollers the first torque and the second drive means is operable to apply a second torque to the rollers, the resultant of the first and second torques being such as to apply a reduced driving force to the articles.

The reduced driving force may be zero.

During the second state of operation the second drive means may be stationary and as a result the rollers may be stationary.

The first drive means may comprise a first drive shaft which extends transversely to the rollers in the general direction of the pass line of the conveyor, the shaft being supported for rotation below the rollers and first drive belts being engaged with the first drive shaft and the rollers to transmit the first torque from the first drive shaft to the rollers.

The second drive means may comprise a second drive shaft which extends transversely to the rollers and generally in the direction of the pass line of the conveyor, the second drive shaft being supported for rotation below the rollers and second drive belts being engaged with the second drive shaft and the rollers to transmit torque from the second drive shaft to the rollers.

In a first more specific aspect of the invention the control means may be operable, during the first state of operation of the conveyor, so that the first drive means is operable to apply to the rollers the first torque and the second drive means is operable to apply to said rollers a further torque in the same rotational sense as the first torque.

During the first state of operation the first drive means may apply the first torque to rotate the rollers at the same speed as the rollers are rotated by the further torque applied by the second drive means.

The second drive means may be driven from a prime mover through a clutch and brake mechanism, the clutch being engaged and the brake disengaged during the first state of operation of the conveyor and the clutch being disengaged and the brake engaged during the second state of operation of the conveyor.

The second drive means may be driven from the first drive means through said clutch and brake mechanism.

The clutch and brake mechanism may be actuated by a fluid operated cylinder in response to an electrical signal.

The clutch and brake mechanism may comprise a mechanical clutch such as a dog clutch or an electro-magnetic clutch.

Alternatively, in a second more specific aspect of the invention, the control means may be operable, during the first state of operation of the conveyor, so that the first drive means is operable to apply to the rollers the first torque and the second drive means is free to be driven by the rollers.

The second drive shaft may be provided with brake means to prevent rotation of the second drive shaft in said second state of operation.

The brake means may be an electromagnetic clutch or may be a mechanical brake which may be operated by a solenoid.

The conveyor may include further rollers upstream and/or downstream of said plurality of rollers said further rollers being driven only by a single friction drive means.

BRIEF DESCRIPTION OF THE DRAWINGS

An embodiment of the invention will now be described in more detail by way of example with reference to the accompanying drawings wherein.

DESCRIPTION OF THE PREFERRED EMBODIMENTS

Figure 1:
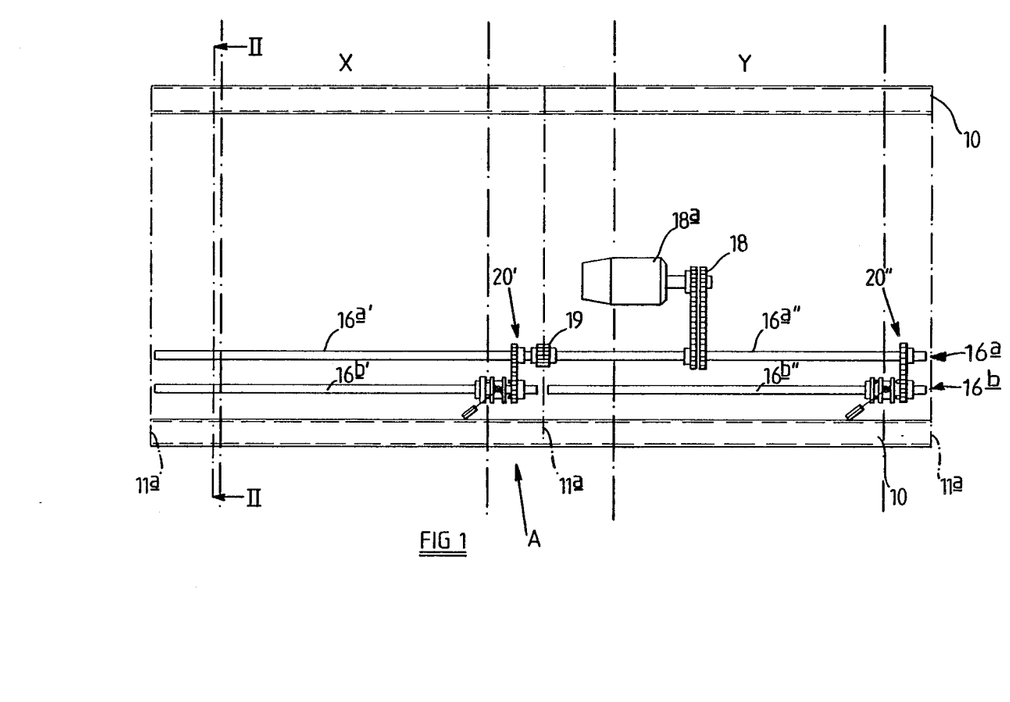
FIG. 1 is a plan view of a conveyor embodying the invention.
Figure 2:
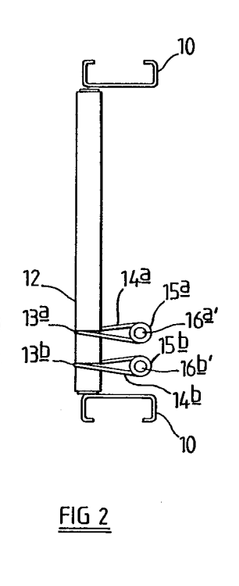
FIG. 2 is a section on the line 11—11 of FIG. 1.
Figure 3:
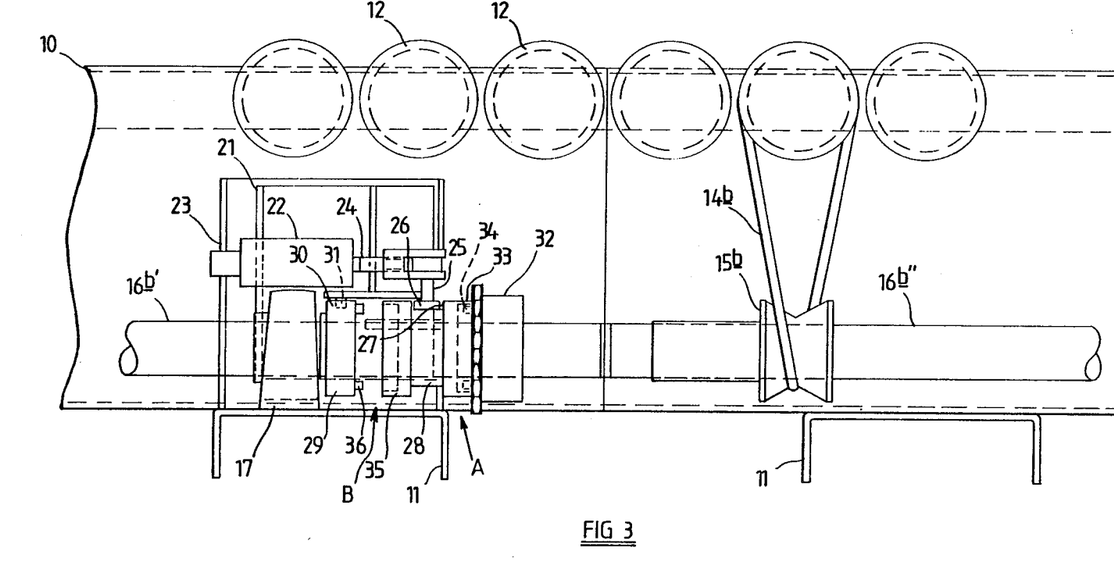
FIG. 3 is a fragmentary side elevation, to an enlarged scale, looking in the direction of the arrow A in FIG. 1.

Referring to FIGS. 1 to 3 of the drawing, two accumulation sections X and Y of a live roller conveyor are illustrated and each comprises a pair of spaced channel section side members 10 interconnected by transversely extending cross-braces 11 (see FIG. 3), and the centre lines of which are illustrated at 11a in FIG. 1. A plurality of cylindrical rollers 12 are rotatably mounted between the side members 10. In FIG. 1 the rollers 12 are not shown, for clarity, but their axes of rotation are illustrated at 12a. The rollers 12 provide a conveying surface and define a pass line for a plurality of articles supported on said surface.

The rollers 12 are provided with two part circular in section circumferential grooves 13a, 13b in each of which is received an elastomeric belt 14a, 14b of circular cross-section. Each belt 14a is engaged with a drive pulley 15a on a first drive shaft 16a whilst each belt 14b is engaged with a drive pulley 15b provided on a second drive shaft 16b. The pulleys 15a, 15b are mounted for rotation relative to their associated shaft 16a, 16b but the load in the belts 14a, 14b is such that friction is exerted between the shafts 16a, 16b and the associated pulleys 15a, 15b to such an extent as to provide a drive to the rollers 12 from the shafts 16a, 16b via the pulleys 15a, 15b and belts 14a, 14b. If, however, any one or more of the rollers 12 is prevented from rotation then slipping can occur between the associated pulleys 15a, 15b and the shaft 16a, 16b to permit continued rotation of the respective drive shaft 16a, 16b.

Each drive shaft 16a, 16b extends longitudinally of the conveyor and is mounted by bearings 17 on the cross braces below the rollers 12 and thus each drive shaft extends parallel to the pass line of the conveyor. The first drive shaft 16a is driven by a chain and sprocket drive 18 from a geared electric motor unit 18a. For constructional reasons the conveyor comprises a plurality of sections which in the present example are approximately 1.3 m long. Only two conveyor sections X and Y are illustrated and the conveyor may have one or more further sections upstream or downstream of the two sections illustrated in FIG. 1. The or each such upstream or downstream section may be provided with only a first drive shaft or one or more of such further upstream or downstream sections may be provided with a first and second drive shaft as in the sections illustrated.

A separate drive shaft section 16a', 16a'' and 16b', 16b'' is provided with each conveyor section and the drive shaft sections 16a' and 16a'' are interconnected by conventional coupling devices 19. The first drive shaft 16a is connected by chain and sprocket drive transmitting connections 20', 20'' to the second drive shaft sections 16b', 16b''.

Referring now particularly to FIG. 3, in which there is illustrated the drive transmitting connection 20' of section X, a convenient cross-brace 11 carries a mounting bracket 21 to which a pneumatic cylinder 22 is pivotally connected about an axis 23. The cylinder 22 has a piston rod 24 which is connected to a clutch actuating member 25 which has a bearing part 26 received in a rectangular cross-section circumferentially extending groove 27 provided on a clutch ring 28 made of nylon or other suitable material. Mounted on the respective shaft 16b', for rotation relative thereto is a locking ring 29 which is restrained from rotation by a peg 30 projecting from a member fixed relative to the bracket 21 and received in a corresponding socket 31 in the locking ring 29. Also rotatably mounted on the respective second drive shaft 16b' is a sprocket member 32 of the drive transmitting assembly 20.

The clutch ring 28 is slidably mounted on the second drive shaft 16b' and prevented from rotation relative thereto. One end 33 of the clutch ring 28 is provided with teeth which engage with teeth 34 fixed to the sprocket 32 so that the teeth can co-operate in the form of a dog clutch A to connect the sprocket 32 with the clutch ring 28. The other end 35 of the clutch ring 28 is similarly provided with teeth which co-operate with teeth 36 provided on the locking ring 29 to again provide a dog clutch B therebetween. When the cylinder 22 is actuated to move the piston 24 thereof to the right in FIG. 3 the dog clutch A is engaged and the dog clutch B is disengaged so that the sprocket 32 is connected to the shaft 16b'. When the cylinder 22 is actuated to move the piston 24 thereof to the left in FIG. 3 the dog clutch A is disengaged and the dog clutch B is engaged so that the drive shaft 16b' is locked from rotation.

A similar arrangement 20'' is provided in section Y as shown in FIG. 1.

In normal operation of the conveyor, herein referred to as a first state, in which articles to be conveyed by each accumulation section are subjected to a normal driving force to convey them along the pass line of the conveyor the cylinder 22 of the sections are operated to engage the respective dog clutch A and so the first drive shaft 16a' and the second drive shafts 16b'' are driven by the motor 18a and hence the associated rollers 12 have applied thereto a first driving torque by the belts 14a from the drive shaft 16a' and a further torque by the belts 14b from the associated shaft 16b', 16b''. The chain and sprocket drive transmitting connections 18, 20', 20'', and the diameters of the pulleys 15a, 15b and of the grooves 13a, 13b in the rollers 12 are arranged so that the rollers are rotated at the same speed by the belts 14a and the belts 14b. In the present example, all the sprockets and pulleys and grooves 13a, 13b are of the same diameter to achieve this but of course, the relative diameters could vary so long as the end result of a rotational drive at the same speed is provided.

When it is desired to relieve the driving force on the articles being conveyed, by both accumulation sections for example, to relieve an end load on a accumulating stop, the cylinders 22 are signalled to move their pistons 24 thereof to the left in FIG. 3 to disengage the dog clutches A and to engage the dog clutches B. In this condition, the drive to the second drive shafts 16b', 16b'' is disconnected and the drive shafts 16b', 16b'' braked by driving clutches B so as to be prevented from rotation under the influence of the belts 14b. Thus, the belts 14b act as a brake by applying to the rollers 12 a second torque in the opposite rotational sense to the first torque which is continued to be applied by the belts 14a from the first drive shaft 16a and the first and second torques are the same or substantially the same in magnitude so that the rollers 12 are braked or substantially braked so that little or no driving force is applied to the articles supported on the conveying surface of the conveyor.

If desired only one of the accumulation sections may be thus operated, the dog clutches A and B of the other sections being actuated to continue to apply the above described further torque.

The cylinder 22 can be fed with air under pressure to act on opposite sides of a piston thereof connected to the piston rod 24 by solenoid operated valves provided with relevant signals according to the state of operation of the conveyor from an electrical control means which may be manually operated or automatically operated, for example by an appropriate sensing device which is actuated when the end load imposed by an article or series of articles on the conveyor exceeds a predetermined value or, alternatively, when it is desired to place the conveyor in to an accumulation mode or, alternatively, when a sensor senses the presence of an article, on an accumulation section, the section may be signalled to assume said second state and stop or delay the article whilst a section downstream of the accumulation section continues to feed a preceding article in the normal way whilst a desired gap is provided between the two articles whereupon the accumulation section is signalled to revert to said first state.

If desired, instead of the clutch and brake mechanism described hereinbefore other equivalent devices may be provided. For example, the dog clutch described could be operated by a hydraulic ram instead of a pneumatic ram or it could be operated electromagnetically.

Figure 4:
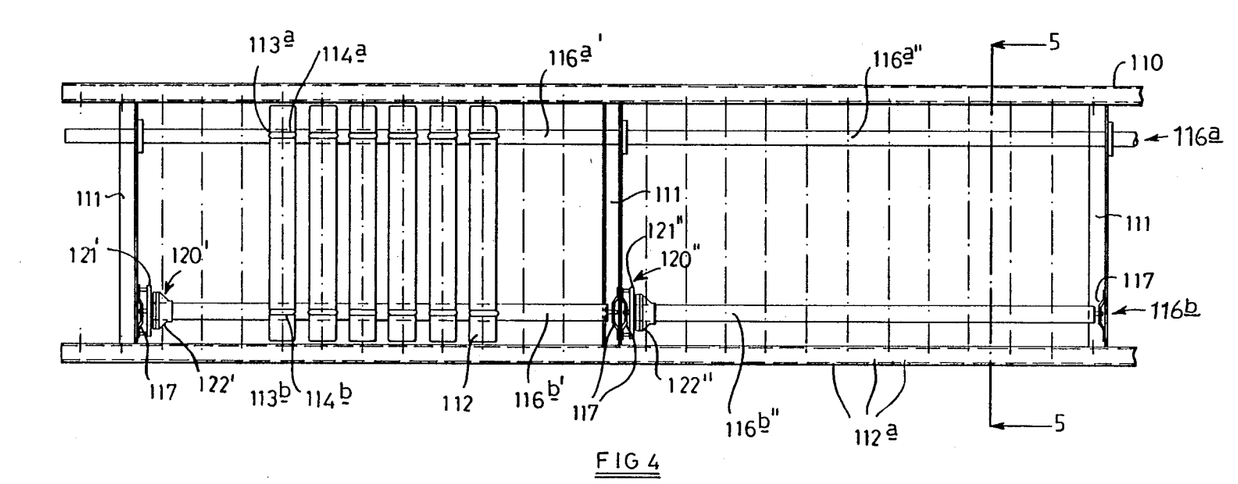
FIG. 4 is a plan view of another conveyor embodying the invention.

Alternatively, a different clutch and brake mechanism may be provided. Further alternatively, and as shown in FIGS. 4 and 5 there are again shown two accumulation sections X and Y of a live roller conveyor and each comprises a pair of spaced channel section side members 110 interconnected by transversely extending cross braces 111. A plurality of cylindrical rollers 112 are rotatably mounted between the side members 110. In FIG. 4 some of the rollers 112 are not shown, for clarity, but their axes of rotation are illustrated at 112a. The rollers 112 provide a conveying surface defining a pass line in the same way as the rollers 12 of the first embodiment and as in the case of the first embodiment the rollers 12 are provided with two part circular in section circumferential grooves 113a, 113b in each of which is received an elastomeric bolt 114a, 114b of circular cross-section. Each belt 114a is engaged with a drive pulley 115a mounted on the first drive shaft 116a whilst each belt 114b is engaged directly with a second drive shaft 116b. If desired, each belt 114b may be engaged with a drive pulley mounted on the second drive shaft, similar to the drive pulleys 115a mounted on the first drive shaft, but as this is not necessary it is preferred for reasons of economy not to provide such pulleys on the second drive shaft. The pulleys 115a are mounted for rotation relative to their associated shaft 116a but the load in the belts 114a is such that friction is exerted between the shafts 116a and the associated pulleys 115a to such an extent as to provide a drive to the rollers 112 from the shafts 116a. If, however, any one or more of the rollers 112 is prevented from rotation then slipping can occur between the associated pulleys 115a and the shaft 116a to permit continued rotation of the drive shaft 116a.

Each drive shaft 116a, 116b extends longitudinally of the conveyor and is mounted by bearings 117 on the cross braces 111 below the rollers 12 and thus each drive shaft extends parallel to the pass line of the conveyor. The first drive shaft 116a is driven by a chain and sprocket drive, not shown, from a geared electric motor unit in the same way as the drive shaft 16a of the first embodiment. As in the case of the first embodiment the conveyor comprises a plurality of sections only two of which, X and Y, are illustrated and as in the case of the first embodiment the conveyor may have one or more further sections upstream or downstream of the two sections shown in FIG. 4 and the various modifications in this regard described with reference to FIGS. 1 to 3 are equally applicable to this embodiment.

Figure 5:
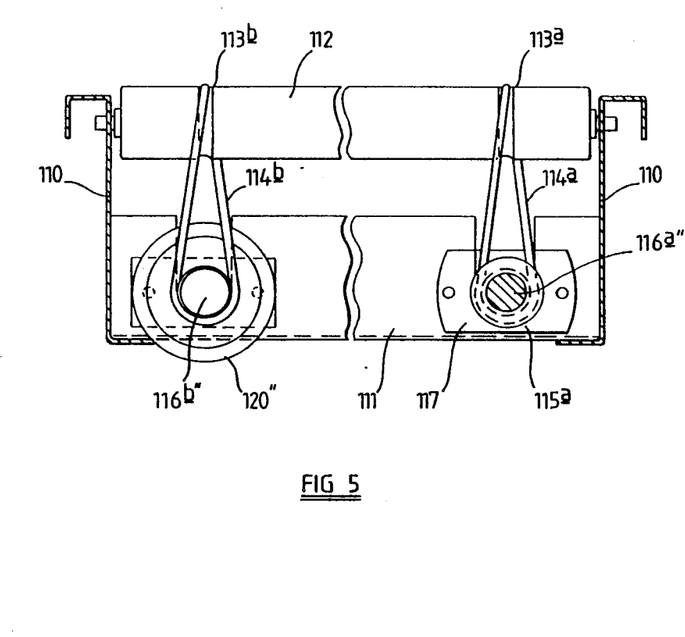
FIG. 5 is a section on the line 5—5 of FIG. 4.

A separate drive shaft section 116a', 116a'' and 116b', 111b'' is provided for each conveyor section and the drive shaft sections 116a' and 116a'' are interconnected by conventional coupling devices.

In this embodiment the second drive shaft sections 116', 116'' are not drivingly connected to the drive shaft 116a and so are free to be driven by the belts 114b.

The relevant cross brace 111 at one end of each conveyor section X, Y has fixed thereto an electromagnetic clutch 120', 120''. One part of which 121', 121'' is fixed by suitable fastenings relative to the associated cross brace 111 whilst the other part 122', 122'' of each clutch is connected to the respective second drive shaft 116b', 116b''.

In normal operation of the clutch, hereinafter referred to as a first state, in which articles to be conveyed by each accumulation section are subjected to a normal driving force to convey them along the pass line of the conveyor the electromagnetic clutches 120', 120'' are disengaged so that the two clutch parts 121', 122', 121'', 122 '' are free to rotate relative to one another. Hence, the first drive shafts 116a', 116a'' are driven by the electric motor and hence the second drive shafts 116b', 116b'' are rotated by the belts 114. Thus, the associated rollers 112 have applied thereto only a first torque by the belts 114a from the drive shafts 116a.

When it is desired to relieve the driving force on the articles being conveyed by both accumulation sections, for example, to relieve an end load on an accumulating stop, the clutches 120', 120'' are actuated to lock the clutch parts 120', 122' and 121'' and 122'' together so that the shafts 116b', 116b'' are prevented from rotation. Thus, the belts 114b act as a brake by applying to the rollers 112 a second torque in the opposite rotational sense to the first torque which is continued to be applied by the belts 114a from the first drive shaft sections 116a', 116a'' and the first and second torques are the same or substantially the same in magnitude so that the rollers 12 are braked or substantially braked so that little or no driving force is applied to the articles supported on the conveying surface of the conveyor. As in the case of the first embodiment, if desired, only one of the acumulations sections may be operated, the clutch 120', or 120'' of the other section being actuated to permit of continued free rotation of the associated second drive shaft 116b', 116b''.

Figure 6:
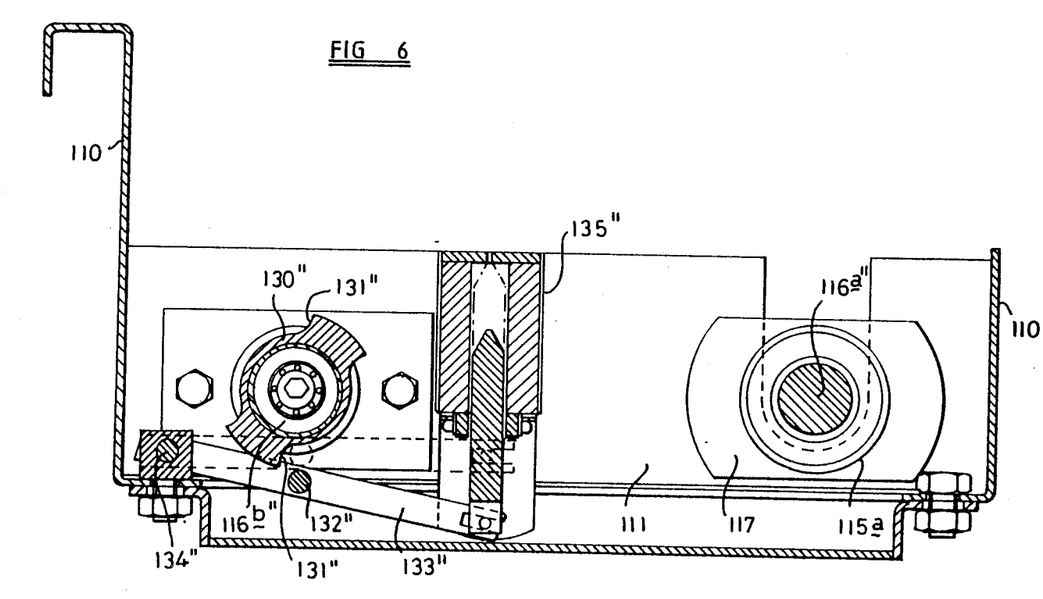
FIG. 6 is a fragmentary side elevation of another embodiment.

If desired, instead of the electromagnetic clutches 120', 120'' any other type of brake may be provided. For example, as shown in FIG. 6, where the same reference numerals are used for the same parts as in FIGS. 4 and 5 a brake member 130'' is mounted on the shaft 116b '' to rotate therewith. A similar brake member is mounted on the shaft 116b'. Each brake member has a pair of opposed radial surfaces 131'', for abutment with a latch bar 132'', carried between a pair of pivoted latch levers 133'' which are pivoted about an axis 134'', by a solenoid 135'' to move the latch bar 132'' into and out of abutting, and hence braking, relationship with a surface 131''.

If desired modifications may be made, for example in a modification of the first embodiment, instead of preventing the second drive shaft from rotation during the second state of operation of the conveyor the second drive shaft may be arranged to be rotated at a slower speed than the first drive shaft but in the same sense of rotation by providing a suitable variable speed connection, not illustrated, instead of the clutch and brake assembly illustrated. Further alternatively the second drive shaft could be arranged to be rotated in the reverse direction to the first drive shaft by providing a suitable reversing mechanism.

The features disclosed in the foregoing description, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A live roller conveyor comprising a plurality of rigid rollers which provides a conveying surface for a plurality of articles supported on said surface, a first friction drive means operable to apply to at least some of the rollers a first torque, a second friction drive means operable to apply to each of said some rollers a second torque, a control means to control the drive means so that a variable driving force may be applied to the articles by said some rollers to advance the articles along the conveyor in a first state of operation of the conveyor and to apply a reduced driving force to the articles in a second state of operation of the conveyor, said control means being operable whereby during said first state of operation of the conveyor, the first drive means applies to each of said some rollers, the first torque and the second drive means applies to each of said some rollers, a further torque in the same rotational sense as the first torque and said control means being operable whereby during said second state of operation, the first drive means applies to each of said some rollers, the first torque and the second drive means applies a second torque to each of said some rollers, the resultant of the first and second torques being such as to apply said reduced driving force to the articles.

2. A conveyor according to claim 1, wherein the reduced driving force is zero.

3. A conveyor according to claim 1 wherein during the second state of operation the second drive means is stationary and as a result each of said some rollers is stationary.

4. A conveyor according to claim 1 wherein the first drive means comprises a first drive shaft which extends transversely to said some rollers in the general direction of the pass line of the conveyor, the shaft being supported below said some rollers and first drive belts being engaged with the first drive shaft and said some rollers to transmit the first torque from the first drive shaft to said some rollers.

5. A conveyor according to claim 1 wherein the second drive means comprises a second drive shaft which extends transversely of said some rollers and generally in the direction of the pass line of the conveyor, the second drive shaft being supported for rotation below said some rollers and second drive belts being engaged with the second drive shaft and said some rollers to transmit torque from the second drive shaft to said some rollers.

6. A conveyor according to claim 1 wherein during the first state of operation the first drive means is operable to apply the first torque to rotate said some rollers at the same speed as said some rollers are rotated by the further torque applied by the second drive means.

7. A conveyor according to claim 1 wherein the second drive means is driven from a prime mover through a clutch and brake mechanism, the clutch being engaged and the brake disengaged during the first state of operation of the conveyor and the clutch being disengaged and the brake engaged during the second state of operation of the conveyor.

8. A conveyor according to claim 7 wherein the second drive means is driven from the first drive means through said clutch and brake mechanism.

9. A conveyor according to claim 7 wherein the clutch and brake mechanism is actuated by a fluid operated cylinder in response to an electrical signal.

10. A conveyor according to claim 1 wherein the conveyor includes further rollers upstream and/or downstream of said plurality of rollers, said further rollers being driven only by a single friction drive means.

11. A conveyor according to claim 7 wherein the clutch and brake mechanism comprises a mechanism comprises a mechanical clutch.

* * * * *

UNITED STATES PATENT AND TRADEMARK OFFICE
CERTIFICATE OF CORRECTION

PATENT NO. : 4,974,723

DATED : December 4, 1990

INVENTOR(S) : Edward W. Toye

It is certified that error appears in the above-identified patent and that said Letters Patent is hereby corrected as shown below:

TITLE PAGE:

After Inventor: "nr." should read --Near--.

After filing date information insert
--Foreign Application Priority Data
April 8, 1988 [UK] United Kingdom 8808290.4--.

Column 5 Line 54 "111b" should read --116b--.

Signed and Sealed this

Sixteenth Day of June, 1992

Attest:

DOUGLAS B. COMER

*Attesting Officer*    *Acting Commissioner of Patents and Trademarks*